(No Model.)

H. HANSON.
ANTI-FRICTION BEARING.

No. 386,315. Patented July 17, 1888.

Witnesses.
Howard F. Eaton.
Fred. L. Greenleaf.

Inventor.
Henry Hanson.
by Crosby & Gregory
Atty's.

UNITED STATES PATENT OFFICE.

HENRY HANSON, OF BOSTON, MASSACHUSETTS.

ANTI-FRICTION BEARING.

SPECIFICATION forming part of Letters Patent No. 386,315, dated July 17, 1888.

Application filed February 14, 1888. Serial No. 263,969. (No model.)

*To all whom it may concern:*

Be it known that I, HENRY HANSON, of Boston, county of Suffolk, and State of Massachusetts, have invented an Improvement in Anti-Friction Bearings, of which the following description, in connection with the accompanying drawings, is a specification, like letters on the drawings representing like parts.

This invention has for its object to provide an adjustable anti-friction bearing especially adapted, among other things, to be used for the journal-bearings of car-axles.

My improved anti-friction bearing is designed to replace the usual bearing of Babbitt metal, and may be applied to car-trucks as now made and used without necessitating any change or alteration in the construction of the said car-trucks.

In accordance with my invention the anti-friction bearing consists of two independent boxes, each provided with anti-friction rollers, as will be described, the said boxes being placed in the usual journal-box of the car-truck, each anti-friction bearing-box being removable independently of the other for purpose of repairs, &c.

My invention therefore consists, essentially, in an anti-friction journal-bearing consisting of two independent boxes, each provided with a shaft or arbor having hubs or enlarged rollers at its opposite ends and adapted to run free in the said boxes, and forming the bearings for the journal of the shaft or axle, combined with a bearing for the shaft or arbor between the said hubs or rollers, substantially as will be described.

Other features of my invention will be pointed out in the claims at the end of this specification.

Figure 1:
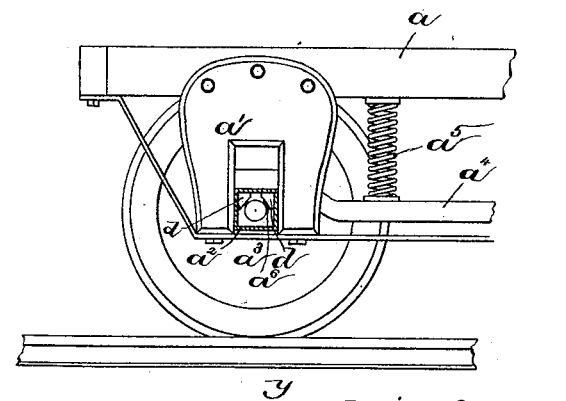
Figure 2:
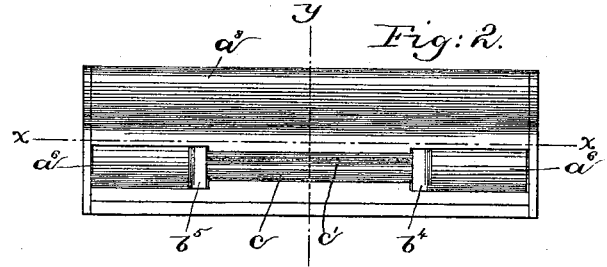
Figure 3:
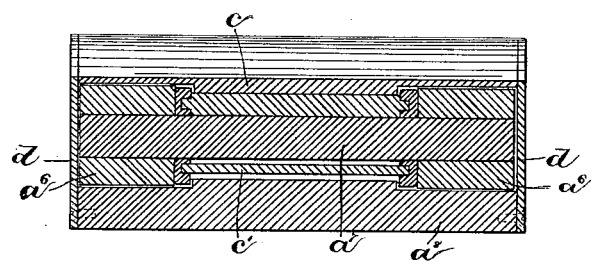
Figures 4, 5:
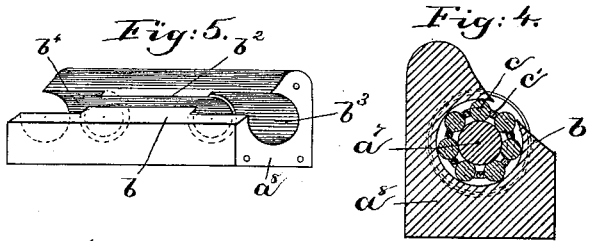

Figure 1 shows a sufficient portion of a car-truck provided with my improved anti-friction bearing-boxes to enable my invention to be understood; Fig. 2, an enlarged top or plan view of one of the bearing-boxes removed; Fig. 3, a section of the bearing-box shown in Fig. 2; Fig. 4, a transverse section of Fig. 2 on line $y$ $y$; and Fig. 5, an isometric view, on a smaller scale, of the bearing-box with the rollers removed.

The car-body $a$, the pedestal or housing $a'$, the journal-box $a^2$, to support the usual journal of the axle $a^3$, carrying the car-wheel, the equalizer-bar $a^4$, and spring $a^5$, are and may be of ordinary or well-known construction, such as now commonly used on railways.

In accordance with my invention the journal of the car-axle $a^3$ has resting on it my improved anti-friction bearings, consisting, essentially, of enlarged hubs or rollers $a^6$ on a shaft or arbor, $a^7$, (see Fig. 4,) located in a box, $a^8$, there being two such boxes for each end or journal of the axle, as shown in Fig. 1.

Each box $a^8$ is provided, as shown, with an inclined face, $b$, having a longitudinal slot or opening which communicates with or leads into a cylindrical chamber, $b^2$, extended longitudinally through the box, the said chamber being, however, of larger diameter at its ends, as at $b^3$ $b^4$, for the reception of the hubs or enlarged rollers $a^6$, which turn freely within the said chambers.

The shaft or arbor $a^7$ has loosely mounted on it, within the chambers $b^4$ $b^3$, collars $b^6$ $b^5$, respectively. Each collar $b^6$ $b^5$ is provided, as shown, with an annular groove or recess, into which are extended the journals of rolls $c$ $c'$, the rolls $c'$ being of less diameter than the rolls $c$, there being a roll $c'$ between every two rolls $c$, as shown in Fig. 4. The rolls $c$ bear upon the interior surface of the chamber $b^2$ and on the shaft or arbor $a^7$. The shaft or arbor $a^7$ and rollers or hubs $a^6$ are secured in place and prevented from longitudinal movement in the box by caps $d$, fastened by screws or otherwise to the ends of the said box.

In operation two boxes, $a^8$, will be placed in the journal-box $a^2$ above the center of the car-axle, the rollers $a^6$ resting upon and forming the bearing for the said axle. These boxes may be applied directly to the journal-boxes $a^2$ of car-trucks as now constructed, and may be brought into proper position therein by "lining up" the said box—that is, by inserting strips of wood or metal between the boxes $a^8$ and the sides or top of the journal-box $a^2$— the said lining being not herein shown, as it is well known in the construction of car-trucks.

The journal of the car-axle has its bearings on the enlarged collars or hubs $a^6$, and the load is transmitted to the rolls $c$ by the shaft $a^7$. In this way the extent of the metal surface in contact is very small, thereby reducing the friction to a minimum. Furthermore, the hubs $a^6$ are made of such size as to obtain a very strong bearing with a minimum contact of metal surface.

My improved anti-friction bearing may, and in practice will preferably, be employed without a lubricant.

I have herein shown and described my improved anti-friction bearing as applied to a car-truck; but I do not desire to limit my invention to this particular use, as it may be employed with shafting of any description.

I claim—

1. An anti-friction journal-bearing consisting of two independent boxes, as $a^8$, each provided with a shaft or arbor, $a^7$, having hubs or enlarged rollers, as $a^6$, at its opposite ends, adapted to run free in the said boxes and forming the bearings for the journal of a shaft or axle, combined with a bearing for the shaft or arbor $a^7$ between the said hubs or rollers, substantially as described.

2. An anti-friction journal-bearing consisting of two independent boxes, as $a^8$, each provided with a shaft or arbor, $a^7$, having hubs or enlarged rollers, as $a^6$, at its opposite ends, and forming the bearing for the journal of the shaft or axle, combined with rollers $c\ c'$, of different diameters, interposed between the said hubs and forming the bearing for the arbor $a^7$, substantially as described.

3. An anti-friction journal-bearing consisting of two independent boxes, as $a^8$, each provided with a shaft or arbor, $a^7$, having hubs or enlarged rollers, as $a^6$, at its opposite ends, and forming the bearings for the journal of the shaft or axle, and collars, as $b^6\ b^5$, mounted on the arbor $a^7$ between said hubs and each provided with a groove, combined with rollers $c\ c'$, of different diameters, having their journals supported in the said grooves and forming the bearing for the arbor $a^7$, substantially as described.

In testimony whereof I have signed my name to this specification in the presence of two subscribing witnesses.

HENRY HANSON.

Witnesses:
J. H. CHURCHILL,
J. C. SEARS.